United States Patent [19]
Hajjar

[11] Patent Number: 5,757,756
[45] Date of Patent: May 26, 1998

[54] REDUCING MARK LENGTH VARIATIONS IN RECORDING DATA IN WOBBLED GROOVE STORAGE MEDIA

[75] Inventor: Roger A. Hajjar, Fairport, N.Y.

[73] Assignee: Eastman Kodak Company, Rochester, N.Y.

[21] Appl. No.: 731,630

[22] Filed: Oct. 15, 1996

[51] Int. Cl.⁶ .................................................. G11B 7/24
[52] U.S. Cl. ............................................. 369/275.1
[58] Field of Search .................... 369/275.1, 275.2, 369/275.3, 275.4, 94, 44.13, 111

[56] References Cited

U.S. PATENT DOCUMENTS

| | | |
|---|---|---|
| 3,654,397 | 4/1972 | Uemura et al. ........................ 360/31 |
| 4,392,219 | 7/1983 | Yokozawa et al. ................... 369/111 |
| 4,525,751 | 6/1985 | Freeman et al. ..................... 369/111 |
| 4,982,398 | 1/1991 | Yamaamoto ....................... 369/44.13 |
| 5,023,856 | 6/1991 | Raaymakers et al. ............. 369/275.1 |
| 5,210,738 | 5/1993 | Iwata et al. ....................... 369/275.1 |
| 5,247,507 | 9/1993 | Morimoto ......................... 369/275.1 |
| 5,321,684 | 6/1994 | Schaefer et al. .................... 369/119 |

*Primary Examiner*—Nabil Hindi
*Attorney, Agent, or Firm*—Raymond L. Owens

[57] ABSTRACT

An optical storage medium comprising a spiraling wobbled groove formed so that its wobble changes in amplitude from the inner diameter to the outer diameter.

4 Claims, 6 Drawing Sheets

REDUCING MARK LENGTH VARIATIONS IN RECORDING DATA IN WOBBLED GROOVE STORAGE MEDIA

FIELD OF THE INVENTION

This invention relates generally to information storage media which has information stored thereon in an optically readable format, and more particularly, to storage media having a substrate with a wobbled groove.

BACKGROUND OF THE INVENTION

In one of the classes of optical information storage medium such as Compact Disc recordable (CD-R), a substrate is fabricated which has a spiral groove formed in one surface of the substrate. Using a spin-coating technique, a dye material layer is applied to the surface of the storage media into which the grooves have been fabricated. The dimensions and shape of the groove can vary depending upon the medium, but a typical groove width is on the order of 0.4 µm in the radial direction of the disc, with adjacent grooves in the spiral separated by about 1.6 µm in the radial direction. In CD-R media, the groove corresponds to a data track on which marks are recorded.

A well known technique for ascertaining disc velocity and beam position in a disc-based systems involves "wobbling" the spiral groove in the radial direction about an average groove centerline. The deviation of the wobbled groove from the centerline is referred to as the wobble amplitude. When a wobbled-groove disc is rotated at, for example, a constant linear velocity of 1.4 m/sec, the wobbled groove will modulate a tracking signal at a predetermined frequency. For CD-R media in systems operating at a write speed of 1 X or 4.32 Mbits/sec, the wobble frequency is 22.05 KHz. The wobble frequency is scaled upward for systems operating at higher speeds such that, for example, a system operating at 6 X will have a wobble frequency of about 132.30 KHz. A servo loop provides the desired disk velocity by controlling the disk motor speed to maintain the tracking signal modulation signal at the wobble frequency.

The beam position on the surface of a wobbled-groove disk may be provided by frequency-modulating the wobble. The modulation of the tracking signal will then vary about the predetermined frequency in accordance with the frequency-modulation of the wobble frequency. In CD-R systems, the frequency modulation of the groove wobble is on the order of plus and minus five percent. The information frequency-modulated onto the groove wobble is often referred to as absolute-time-in-pregroove (ATIP) information. The ATIP information typically includes binary data indicating the amount of time the beam would have spent in the spiral groove to reach a given position on the disk surface by following the groove from its beginning at the inner disk diameter. The time may be represented in minutes, seconds and frames, with a frame corresponding to, for example, 1/75 of a second. The ATIP modulation may also include other information such as a disk identifier, synchronization marks and the expected optimum recording power. ATIP is described in greater detail in U.S. Pat. Nos. 5,363,360; and 5,506,824; 5,508,985 which is assigned to the present assignee and the disclosure of which is incorporated herein by reference.

The wobble amplitude is determined in order to produce a required wobble carrier to noise ratio (WCNR) of greater than 35 dB. Adequate WCNR is important for ATIP detection used by the writer in order to determine beam position as mentioned above. An increase in wobble amplitude leads to an increase in wobble carrier to noise ratio.

However, an increase in wobble amplitude coupled with a track offset leads to a rapid deterioration of the recording performance as shown in FIG. 1. FIG. 1 illustrates the reduction in window margin (which is a figure of merit related to bit error rate) as a function of an increase of wobble amplitude at a track offset of 100 nm. The window margin becomes negative at about a wobble amplitude of 40 nm. One approach to alleviating the above-described performance deterioration problem due to track offset is to use a tracking servo to maintain the radiation beam spot ontrack, that is, centered about the centerline of the wobbled groove. One such technique is described in detail in commonly assigned U.S. patent application Ser. No. 08/584,933 filed Jan. 16, 1996 entitled "Dynamic Tracking Control in an Optical Recording System by Sensing Mark Formation," to Eastman et al. However, most recording systems do not have the capability of detecting required track offsets in order to record the data in the center of the groove. As discussed above, recording off-track can result in a significant data degradation due to the wobble on the disc.

As is apparent from the above, a need exists for reducing the mark length variation at the inner diameter of a CD-R resulting from off-track recording on a wobbled groove.

SUMMARY OF THE INVENTION

In accordance with the present invention, it has been determined that if the wobble amplitude is held constant across the disc, the WCNR drops at the outer diameter due to disc manufacturing conditions such as loss of replication of the groove or dye conformality across the disc.

The present invention is directed at reducing the effect of track offset resulting from disc manufacturing at the inner diameter. Briefly summarized, an aspect of the present invention includes an optical storage medium comprising a spiraling wobbled groove with its wobble amplitude changing from the inner diameter to the outer diameter.

Advantages

Reducing the wobble amplitude at the inner diameter of the disc reduces the effect of off-track recording. The wobble amplitude can then be increased toward the outer-diameter in order to compensate for a loss in WCNR.

DETAILED DESCRIPTION OF THE INVENTION

Figure 1:
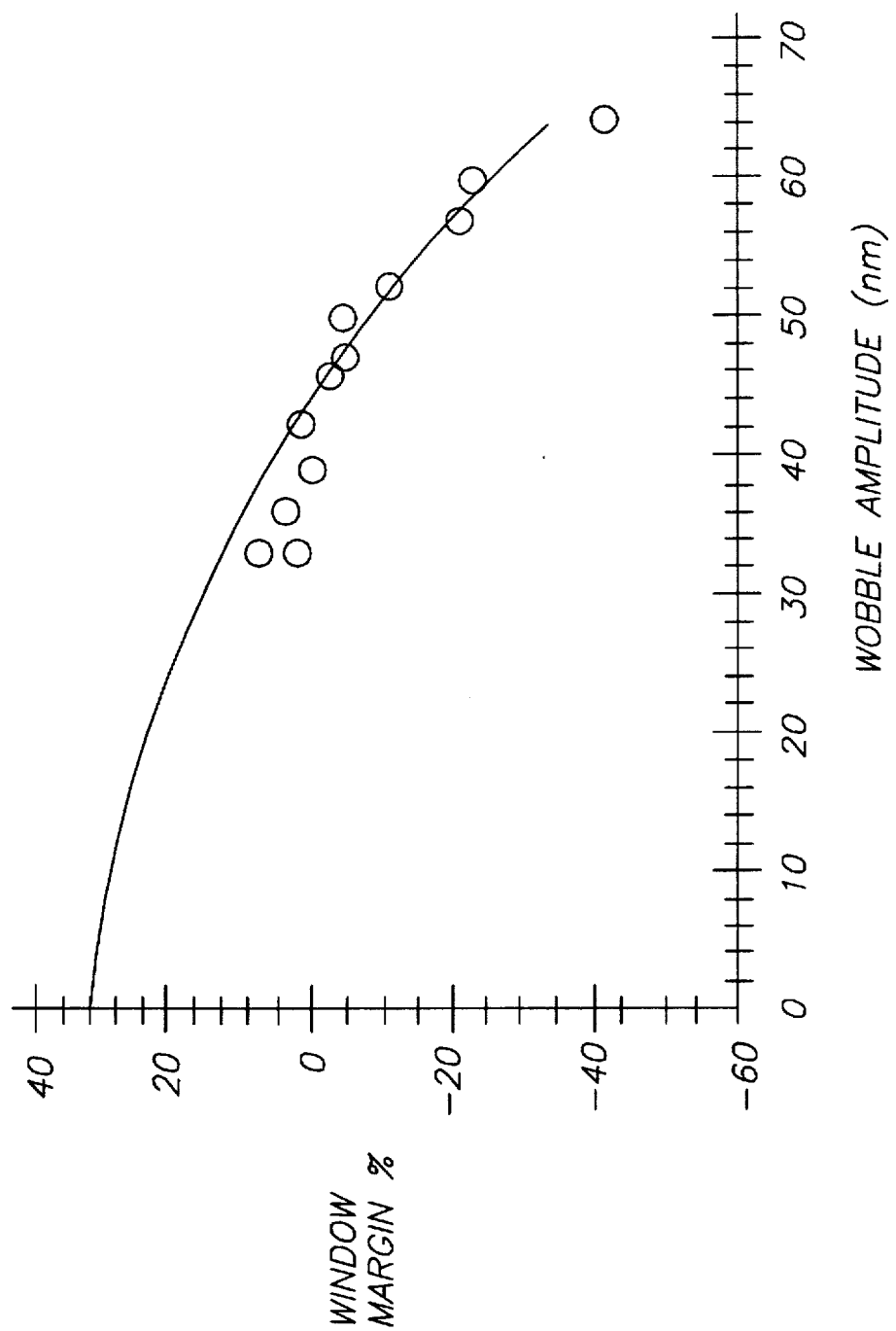
FIG. 1 is a graph of WA vs. performance.
Figure 2:
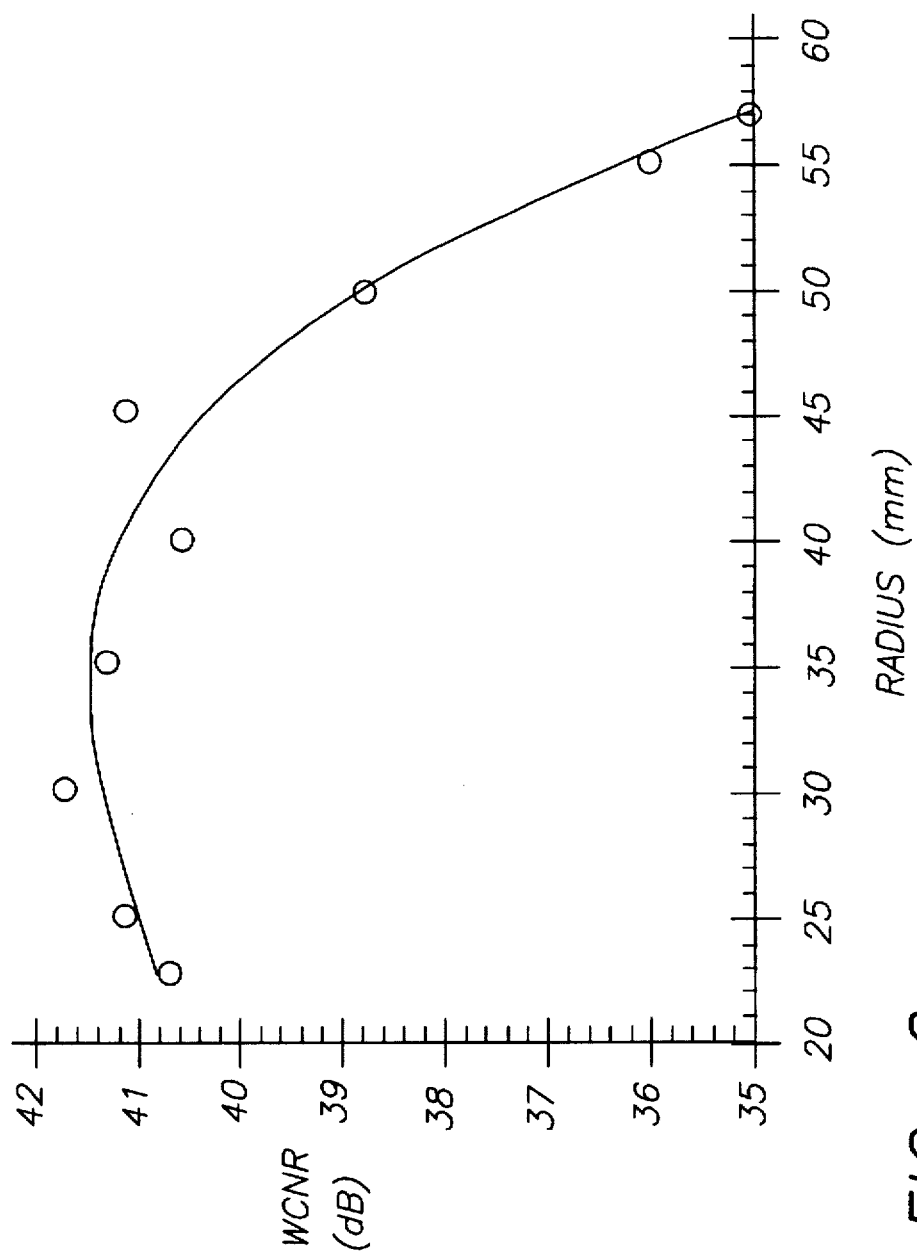
FIG. 2 is a graph of WCNR vs. radius showing an exemplary wobble carrier-to-noise ratio across a CD-R.

FIG. 2 is a graph which shows an exemplary WCNR across a CD-R. Generally, the WCNR at the outer diameter determines the setting for wobble amplitude across the disc.

However, an increase of wobble amplitude and especially at the inner diameter can affect the quality of recording on a CD-R.

Figure 3:
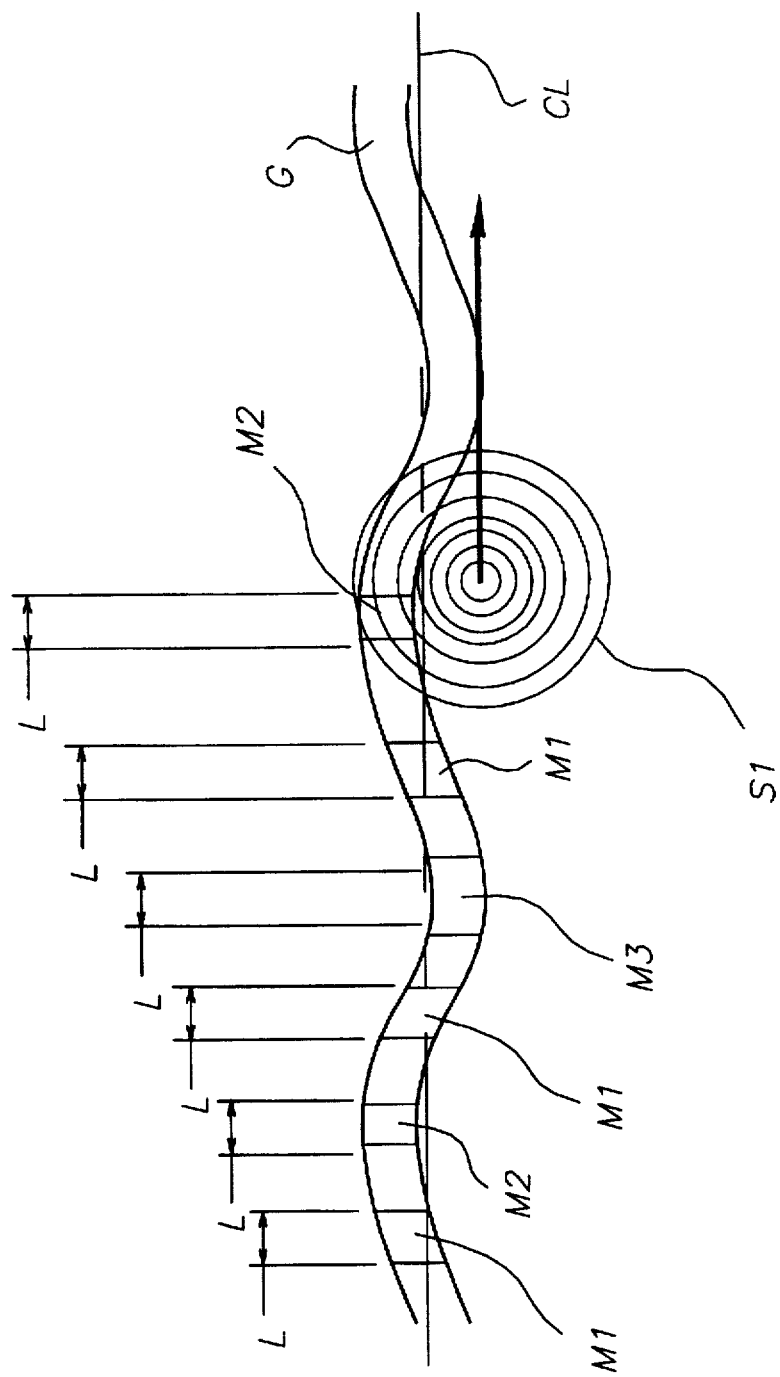
FIG. 3 illustrates a wobble-induced variation in mark length resulting from off-track recording spot on an exemplary portion of an optical recording medium.

FIG. 3 illustrates a significant mark length variation problem which may arise when a wobbled groove is used on a recordable medium such as a CD-R disk. A portion of a wobbled groove G is shown illuminated by a spot S1 of an optical recording beam. The view shown is looking down on the disk in a direction normal to its laser-incident surface. The disk which includes the data track corresponding to groove G is rotated past the stationary beam at a desired velocity, such that S1 moves relative to the disk in the direction indicated. It should be noted that the amount of groove wobble is exaggerated in FIG. 3 for illustrative purposes. The wobble amplitude for CD-R media is typically on the order of 25-36 nm, while the width of the groove G is on the order of 0.4 μm. Marks M1, M2 and M3 have been formed by spot S1 in a data track defined by the groove G. The spot S1 generally has a gaussian power distribution and is therefore shown in FIG. 3 as a number of concentric circles, in which a closer spacing of circles indicates a higher incident power level. The spot S1 generally has a width of greater than 0.5 μm but less than 2.0 μm, but can of course vary depending upon the application.

Figure 4:
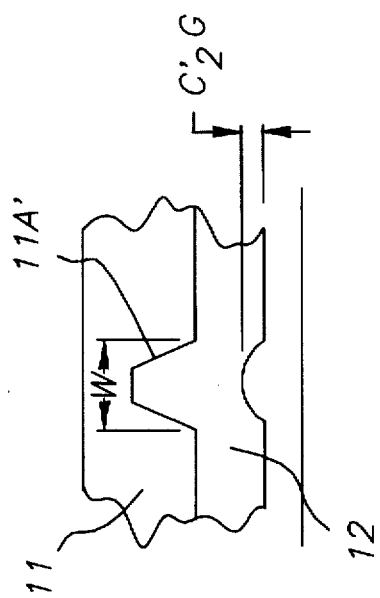
FIG. 4 is a cross-sectional view of a groove on a disc having a dye coated layer spin-coated thereon.

The mark length variation problem occurs when the radiation beam producing spot S1 is off-track in either direction of the groove centerline CL. Generally, proper mark length formation will require that the spot S1 be substantially centered about the centerline CL of the groove G. The spot S1 in FIG. 2, however, is off-track in a radial direction below the groove centerline. As a result of the groove wobble, the portion of S1 incident on the track, and therefore its intensity level, will vary. Nominal marks M1 of a desired length L are created when S1 is over the track defined by the groove for the proper amount of time and at the proper intensity. At the "peaks" of groove G in FIG. 3, a less intense portion of S1 illuminates the track, and for a shorter period of time, resulting in a shorter mark M2 with a length less than L. At the "troughs" of groove G, a more intense portion of S1 illuminates the track, and for a longer period of time, resulting in a longer mark M3 with a length greater than L. FIG. 4 shows a cross-sectional view of the wobble groove. The groove is formed in substrate surface. The arrangement is such that the laser light intensity will cause a marked recording in a dye layer substantially only in the groove.

Figure 5A:
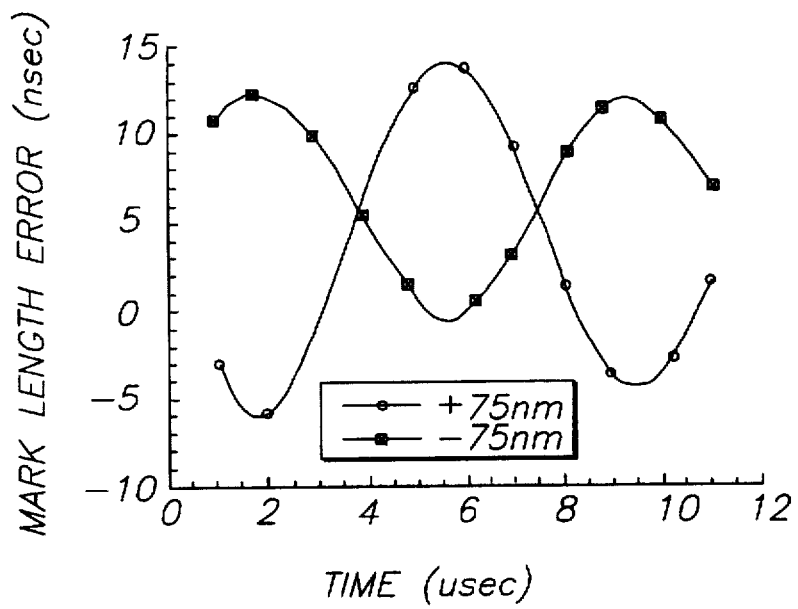
FIGS. 5a and 5b are plots of mark length variation and land length variation, respectively, for different track offsets.
Figure 5B:
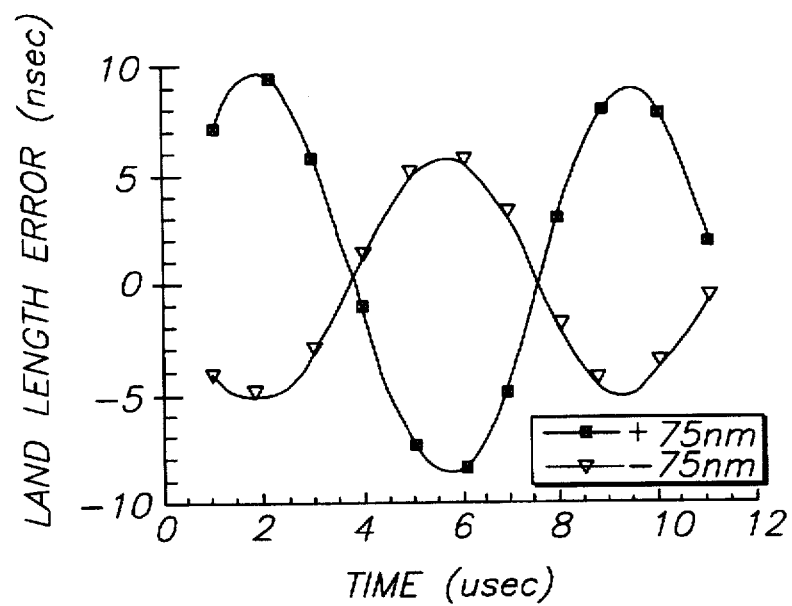

FIGS. 5a and 5b plot the variation in mark length and land length, respectively, as a function of time for different track offsets for structures such as in FIG. 4 which will be discussed later. The variation in mark length is generally a function of the wobble frequency as shown in FIG. 5a. The mark length variation which results when the spot is shifted in one direction relative to the centerline by 75 nm is reversed in sign when the spot is moved off-track in the opposite direction by 75 nm. FIG. 5b shows that land length variation exhibits the expected complementary response. When the recorded marks are subsequently read back, the mark length variation exhibited in FIGS. 3 and 5a causes jitter in the resulting data signal, thereby significantly degrading overall system performance.

Figure 6:
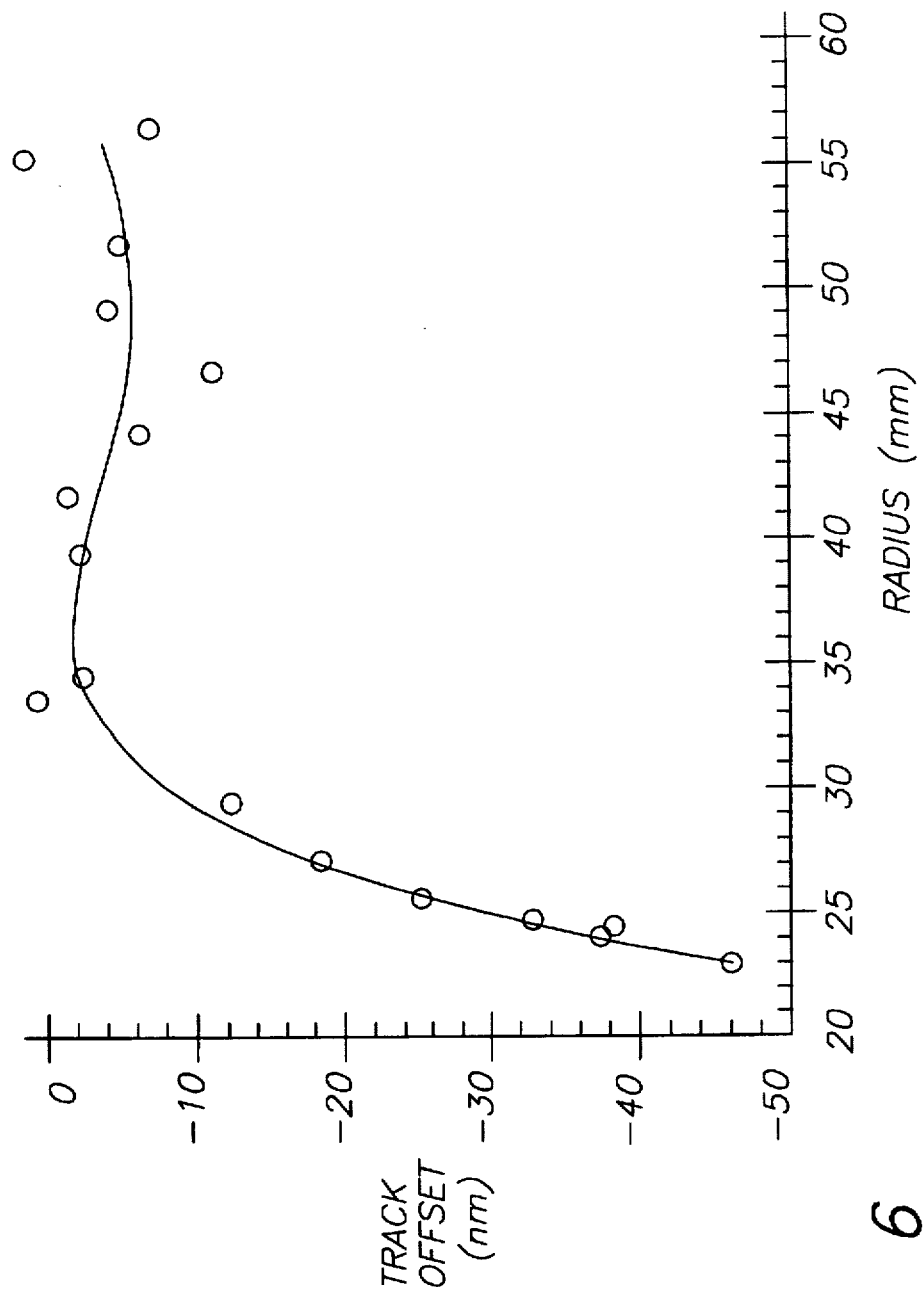
FIG. 6 is a graph demonstrating track-offset requirement for a CD-R.

Track offsets can be the result of several system perturbations such as optical head alignment, disc tilt in the radial direction, or due to dye-coating-substrate interaction. It has been discovered, in accordance with the present invention, that the latter cause can result in track offsets in excess of 50 nm. Best track or the amount of track offset that a recording system has to have for ideal recording conditions is shown in FIG. 6 for an exemplary commercially available CD-R. Note that the track offset decreases at the inner diameter by as much as 50 nm. In addition, CD-R media is known to have higher radial tilt at the inner-diameter due to molding conditions which will increase the amount of track offset at the inner-diameter.

Figure 7:
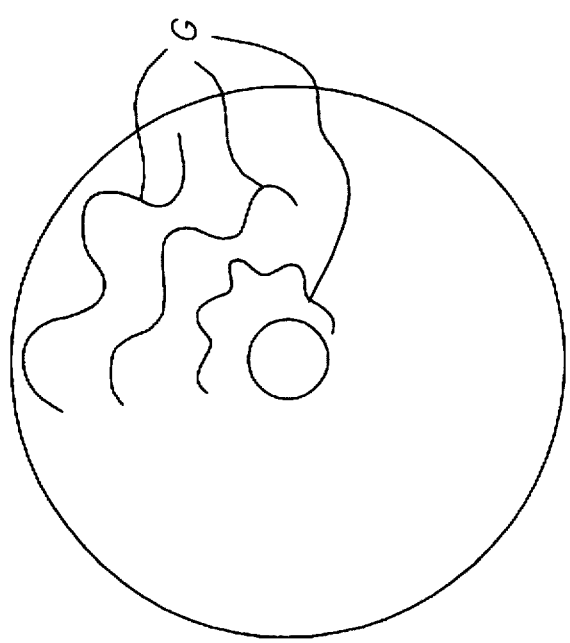
FIG. 7 is a top view of a CD-R disc showing the varying amplitude of the wobble groove for the inner and outer radius.

In order to reduce the impact of off-track recording at the inner diameter of the disc, a reduction in wobble amplitude is desirable. However, a reduction of wobble amplitude across the disc might reduce the WCNR considerably at the outer diameter as discussed above. The present invention produces a substrate with a wobble amplitude gradient as illustrated in FIG. 7. The gradient can be either increased in discreet steps or gradually depending on the manufacturing capability. The wobble settings across the disc should be determined such as the WCNR is above a specified value (35 dB) across the disc. The whole amplitude can drop by as much as 30 nm at the inner diameter without a significant impact on WCNR while it has to increase to about 40 nm at the outer diameter in order to account for a drop in WCNR due to loss of replication.

Turning now to FIG. 4 which is a cross-sectional view of a groove on a disc having a dye material layer spin-coated thereon. More particularly, the disc includes a transparent substrate which can be made of polycarbonate or the like formed in a surface of the substrate is the wobble groove. As shown, a dye material layer is spin-coated onto the substrate surface and into the groove. A reflective coating made of material such as gold is provided on the dye material layer. Typically, the reflective coating will be sputtered onto the dye material layer. For a more complete description of this type of groove, the dye material layer, and the spin-on process, see commonly assigned U.S. Pat. No. 5,500,266 issued Mar. 19, 1996 to Durnin.

The invention has been described in detail with particular reference to certain preferred embodiments thereof, but it will be understood that variations and modifications can be effected within the spirit and scope of the invention.

Parts List

M1 marks
M2 marks
M3 marks
S1 spot
G groove
CL groove centerline

I claim:

1. An optical storage medium comprising:
   a) a transparent substrate having a wobbled groove, said wobbled groove being fabricated into a first surface of a substrate;
   b) a dye layer formed on said first surface and wherein said dye layer is spin-coated on said first surface and into such wobbled groove;
   c) the groove being formed so that its wobble changes in amplitude from the inner diameter to the outer diameter;

d) a reflective layer on the dye layer; and e) the inner diameter has an wobbled amplitude in a range of 20 nm to 30 nm and an outer diameter in a range of 30 nm to 40 nm.

2. The optical storage medium of claim 1 includes a protective film formed on the reflective layer.

3. The optical storage medium of claim 1 wherein the inner diameter amplitude is less than the outer diameter amplitude.

4. An optical storage medium comprising:

a) a spiraling wobbled groove being formed so that its wobble changes in amplitude from the inner diameter to the outer diameter so that it changes and wherein the inner diameter amplitude is less than the outer diameter amplitude; and b) the inner diameter has wobbled amplitude in a range of 20 nm to 30 nm and an outer diameter in a range of 30 nm to 40 nm.

* * * * *